US012605622B2

(12) United States Patent
Tong et al.

(10) Patent No.: US 12,605,622 B2
(45) Date of Patent: Apr. 21, 2026

(54) METHOD AND APPARATUS FOR CONTROLLING MOVEMENT OF VIRTUAL OBJECT IN GAME, ELECTRONIC DEVICE, AND STORAGE MEDIUM

(71) Applicant: NETEASE (HANGZHOU) NETWORK CO., LTD., Hangzhou (CN)

(72) Inventors: Siwei Tong, Hangzhou (CN); Wanding Yan, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 249 days.

(21) Appl. No.: 18/260,326

(22) PCT Filed: Aug. 5, 2021

(86) PCT No.: PCT/CN2021/110944
§ 371 (c)(1),
(2) Date: Jul. 4, 2023

(87) PCT Pub. No.: WO2022/213521
PCT Pub. Date: Oct. 13, 2022

(65) Prior Publication Data
US 2024/0293731 A1 Sep. 5, 2024

(30) Foreign Application Priority Data
Apr. 6, 2021 (CN) .......................... 202110368943.X

(51) Int. Cl.
*A63F 13/57* (2014.01)
*A63F 13/2145* (2014.01)
(52) U.S. Cl.
CPC .......... *A63F 13/2145* (2014.09); *A63F 13/57* (2014.09); *A63F 2300/6045* (2013.01)

(58) Field of Classification Search
CPC .................. A63F 13/2145; A63F 13/57; A63F 2300/6045
(Continued)

(56) References Cited

U.S. PATENT DOCUMENTS 8,062,128 B2 11/2011 Jobe et al.
10,459,526 B2 * 10/2019 Gontovnik .............. G06F 3/017
(Continued)

FOREIGN PATENT DOCUMENTS

CN 108939546 A 12/2018
CN 110354489 A 10/2019
(Continued)

OTHER PUBLICATIONS

International Search Report dated Jan. 12, 2022 of International Application No. PCT/CN2021/110944.
(Continued)

*Primary Examiner* — Allen Chan
(74) *Attorney, Agent, or Firm* — Qinghong Xu

(57) ABSTRACT

A method and apparatus for controlling movement of a virtual object in a game, an electronic device, and a storage medium. The method for controlling movement of a virtual object in a game comprises: providing a movement control area and a movement state control in a user interface; according to a first touch operation, controlling the virtual object to be in a first movement state in a game scene, wherein the first touch operation is a sliding operation of which an initial touch point is located in the movement control area, and a final touch point is located on the movement state control; and in a process that the virtual object is in the first movement state, in response to a second touch operation for the movement state control, controlling the virtual object to switch from the first movement state to a second movement state in the game scene.

19 Claims, 9 Drawing Sheets

(58) Field of Classification Search
USPC .......................................................... 463/31
See application file for complete search history.

(56) References Cited

U.S. PATENT DOCUMENTS

| | | | |
|---|---|---|---|
| 11,351,456 B2 * | 6/2022 | Wan ......................... | A63F 13/42 |
| 2008/0316183 A1 * | 12/2008 | Westerman ......... | G06F 3/04883 |
| | | | 345/173 |
| 2014/0302900 A1 * | 10/2014 | Lee ..................... | A63F 13/5258 |
| | | | 463/4 |
| 2015/0185826 A1 * | 7/2015 | Mullins .................. | G06F 3/017 |
| | | | 345/633 |
| 2020/0086214 A1 | 3/2020 | Yabuki et al. | |

FOREIGN PATENT DOCUMENTS

| | | | |
|---|---|---|---|
| CN | 111399639 A | 7/2020 | |
| CN | 111973987 A | 11/2020 | |
| CN | 112416196 A | 2/2021 | |
| CN | 113181651 A | 7/2021 | |

OTHER PUBLICATIONS

How to Sprint in the PUBG Mobile, Baidujingyan https://jingyan.baidu.com/article/47a29f24640045c014239991.html), Feb. 11, 2018(Feb. 11, 2018).
Notice of Allowance dated Dec. 15, 2023 for Chinese Application No. 202110368943.X.

* cited by examiner

900a

900b

METHOD AND APPARATUS FOR CONTROLLING MOVEMENT OF VIRTUAL OBJECT IN GAME, ELECTRONIC DEVICE, AND STORAGE MEDIUM

CROSS REFERENCE TO RELATED APPLICATION(S)

This application is a 35 U.S.C. 371 national phase application of PCT International Application No. PCT/CN2021/110944 filed on Aug. 5, 2021, which claims the priority of the Chinese patent application with an application number of 202110368943.X, titled by "Method and Apparatus for Controlling Movement of Virtual Object in Game, Electronic Device, and Storage Medium", and filed on Apr. 6, 2021, the entire contents of both are incorporated herein by reference.

TECHNICAL FIELD

The present disclosure relates to the field of human-computer interactions, in particular, to a method and an apparatus for controlling movement of a virtual object in a game, an electronic device, and a computer-readable storage medium.

BACKGROUND

With the development of mobile communication technologies, it is becoming more and more popular for users to use smart user terminals such as a mobile phone and a tablet computer to run various game programs. In some game programs, in order to make the game character more flexible during movement, it is necessary for the player to control the game character to quickly switch from one movement state to another movement state at any time.

It should be noted that the information disclosed in the above background section is only used to enhance understanding of the background of the present disclosure, and therefore may include information that does not constitute the relevant technology known to those of ordinary skills in the art.

SUMMARY

The present disclosure provides a method and an apparatus for controlling movement of a virtual object in a game, an electronic device, and a storage medium. According to an aspect of the present disclosure, a method for controlling movement of a virtual object in a game is provided. The game includes a game scene and the virtual object in the game scene. At least a part of the game scene is displayed in a user interface of a user terminal. The method includes: providing a movement control area and a movement state control in the user interface; controlling the virtual object to be in a first movement state in the game scene according to a first touch operation, where the first touch operation is a sliding operation in which the initial touch point is located in the movement control area and the final touch point is located in the movement state control; in response to the virtual object being in the first movement state, and a second touch operation on the movement state control, controlling the virtual object to switch from the first movement state to a second movement state in the game scene, where the second touch operation is a touch operation that occurs after the touch point of the first touch operation leaves the movement state control.

According to another aspect of the present disclosure, an apparatus for controlling movement of a virtual object in a game is provided. The game includes a game scene and the virtual object in the game scene. At least a part of the game scene is displayed in the user interface of the user terminal. The apparatus includes: a provision module, configured to provide a movement control area and a movement state control on the user interface; a control module, configured to control the virtual object to be in a first movement state in the game scene according to a first touch operation, where the first touch operation is a sliding operation in which the initial touch point is located in the movement control area and the final touch point is located in the movement state control; and a switching module, configured to, in response to the virtual object being in the first movement state, and a second touch operation on the movement state control, control the virtual object to switch from the first movement state to the second movement state in the game scene, where the second touch operation is a touch operation that occurs after the touch point of the first touch operation leaves the movement state control.

According to yet another aspect of the present disclosure, there is provided an electronic device, including: a processor; and a memory for storing executable instructions of the processor. The processor is configured to execute the executable instructions to perform the method for controlling movement of a virtual object in a game according to any one of the above embodiments.

According to still another aspect of the present disclosure, a computer-readable storage medium is provided. A computer-executable program is stored in the computer-readable storage medium. When the computer-executable program is loaded and executed by a processor, the method for controlling movement of a virtual object in a game according to any one of the above embodiments is performed.

It is to be understood that both the foregoing general description and the following detailed description are exemplary and explanatory only and are not restrictive of the present disclosure.

BRIEF DESCRIPTION OF THE DRAWINGS

The above and other features and advantages of the present disclosure will become more apparent by describing in detail example embodiments thereof with reference to the accompanying drawings. Apparently, the drawings in the following description are only some embodiments of the present disclosure, and those skilled in the art may obtain other drawings according to these drawings without creative efforts. In the drawings.

DETAILED DESCRIPTION

Figure 1:
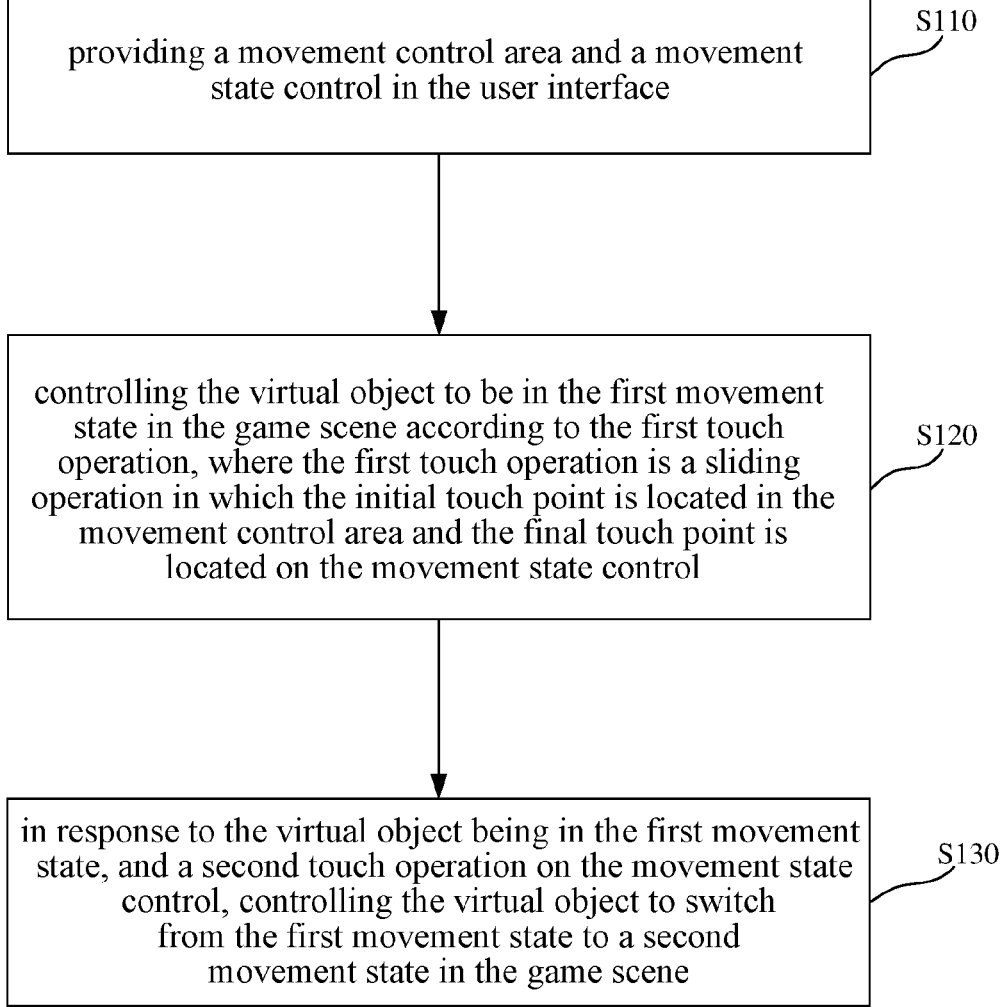
FIG. 1 schematically shows a flowchart of a method for controlling movement of a virtual object in a game according to an embodiment of the present disclosure.

Examples will now be described more fully with reference to the accompanying drawings. Examples may, however, be embodied in many forms and should not be construed as limited to embodiments set forth herein. Rather, these embodiments are provided so that the present disclosure will be thorough and complete, and will fully convey the concept of examples to those skilled in the art. The same reference numerals denote the same or similar components in the drawings, and thus their repeated descriptions will be omitted.

Furthermore, the described features, structures, or characteristics may be combined in any suitable manner in one or more embodiments. In the following description, numerous specific details are provided in order to give a thorough understanding of embodiments of the present disclosure. However, those skilled in the art will appreciate that the technical solutions of the present disclosure may be practiced without one or more of the specific details, and other methods, components, materials, apparatuses, steps, etc. may be employed. In other instances, well-known structures, methods, apparatuses, implementations, materials, or operations are not shown or described in detail to avoid obscuring aspects of the present disclosure.

The block diagrams shown in the drawings are merely functional entities and do not necessarily correspond to physically separate entities. That is, these functional entities may be implemented in software. Alternatively, these functional entities, or part of them may be implemented in one or more software-hardened modules. Further alternatively, these functional entities may be implemented in different networks and/or processor devices and/or microcontroller devices.

"Sliding tackle" is taken as an example, which is used as a tactical operation, where when the player's character is running in the game, a press button is adopted to accomplish a quick sliding with a low posture over a certain distance in the running direction. When this tactical operation is triggered, the player may switch between offense and defense states at any time during the movement (by triggering the sliding tackle action to avoid the aimed attack from the opponent and counterattack the opponent at the same time). This is a high-frequency operation in the game and is extremely tactical.

In this kind of games including actions such as sliding tackle, when a mobile phone game is taken as an example, the related technology provides a solution to control the player's character in movement, attack, and sliding tackle by providing a virtual joystick control, a virtual attack control, and a virtual squat control on the user interface. The sliding tackle operation is accomplished as follows: the user's left hand is responsible for controlling the virtual joystick located at the left side of the screen, so that the player's character in the game enters a running state; the user's right hand is responsible for controlling the squat virtual control or other virtual controls located at the right side of the screen, so that the sliding tackle action may be accomplished by touch thereon in the running state. That is to say, in the game, in order to realize sliding tackle, the user needs a combination of left-hand and right-hand operations. For example, the left hand controls the character to enter the running state, while the right hand is responsible for clicking, double-clicking, or long-pressing the "squat" button to realize sliding tackle. However, in the above-mentioned operations for realizing sliding tackle, usually the two touch operations, including the attack command and the sliding tackle command, require the right hand to be in charge, thus being mutually exclusive. This prevents the player from triggering the sliding tackle command at the same time while triggering the attack command, or vice versa. Moreover, the operation for triggering sliding tackle is realized by touching the squat control during movement of the player character. The design of the control operation mode is not associated with the execution of game actions, which cannot improve the player's sense of immersion.

In another related technology, a solution is also provided where the "sliding tackle" operation is realized by the left hand and the right hand is freed for the attack operation. The specific implementation is as follows: the sliding-up acceleration and the sliding-down acceleration of the left-hand touch point when the character enters the running state are calculated and compared; and if it is determined that the sliding-up acceleration is greater than the sliding-down acceleration, the sliding tackle action of the character is triggered. This solution is prone to misoperation or blank operation in emergency situations, and makes logic decision extremely complicated at the level of function realization.

To sum up, in related technologies, the implementation of the sliding tackle action itself is complicated to operate, which affects the continuity of the player's control, and easily causes failure of the desired action trigger. Therefore, how to provide a fast switching scheme of character movement state with a simple user operation, high fault tolerance rate, and simplified determination logic has become a technical problem to be solved urgently by those skilled in the art.

First of all, some terms involved in the present disclosure are explained as follows.

Game scene: it is the virtual environment displayed (or provided) when the application program is running on the terminal. The virtual environment may be a simulation environment of the real world, a semi-simulation and semi-fictional three-dimensional environment, or a purely fictional three-dimensional environment. The game scene may also be any one of a two-dimensional virtual environment and a three-dimensional virtual environment. In one or more examples of the present disclosure, the game scene is also used for fights between at least two virtual objects, and there are virtual resources available for use by the virtual objects in the game scene.

Virtual object: it may also be understood as a virtual character, which refers to a movable object in a game scene. The movable object may include but not limited to: a virtual character, a virtual animal, a virtual carrier, and the like. In one or more examples of the present disclosure, when the game scene is a three-dimensional virtual world, the virtual object may be a three-dimensional model. Each virtual object has its own shape and volume in the three-dimensional virtual world, and occupies a partial space of the three-dimensional virtual world. In one or more examples of the present disclosure, the virtual object is a three-dimensional character constructed based on the three-dimensional human skeleton technology, and different external images may be realized by the virtual object by wearing different skins. In some implementations, the virtual object may also be implemented using a 2D model, which is not limited in embodiments of the present disclosure. In one or more embodiments of the present disclosure, a virtual object may refer to an object that may be controlled by a user player to act in a game scene.

Field of view: it refers to part of the game scene captured by the virtual camera set relative to the master virtual object, where the part of the game scene captured is displayed on the user interface of the terminal. The virtual camera set relative to the master virtual object means that the virtual camera has a preset binding relationship with the master virtual object, the virtual camera may move with movement of the master virtual object, and/or the orientation of the virtual camera may rotate with rotation of the master virtual object. For example, in a third-person game, the virtual camera may be set above the back of the virtual object (for example, 45 degrees obliquely above) or directly above the virtual object. At this time, the field of view is part of the game scene including the master virtual object and captured by the virtual camera from a upward view. As another example, in a first-person game, the virtual camera is set on the head of the master virtual object (such as eye position). At this time, the field of view is part of the game scene located in a preset range in front of the master virtual object and captured by the virtual camera.

Movement state: it refers to the posture/action of the virtual object when it moves in the game scene, and is displayed on the user interface of the user terminal by animation playback. Generally speaking, there are two types of movement states. The first movement state refers to a continuous movement state that is directly triggered from the static state of the virtual object, including but not limited to: walking, walking while squatting, running, running while squatting, crawling, swimming, flying, climbing, driving, etc. The second movement state refers to an instant movement state that is triggered and quickly switched to only when the virtual object is in the first movement state, so as to achieve a sudden posture change during the movement for avoiding attacks from enemies, including but not limited to: sliding tackle or rolling forward (for example, obtained by quickly switching from walking, walking while squatting, running, running while squatting, etc.), floating or diving (for example, obtained by quickly switching from the swimming state), drifting or jumping out of a carrier (for example, obtained by quickly switching from the driving state).

At present, in the related technologies about controlling movement of a virtual object in a game, there is also a scheme for quickly switching the virtual object between different movement states when operating with a single finger. The specific implementation is as follows: when the virtual object is in a running state, the finger slides down and slides up in the area above the virtual joystick so as to calculate the slide-down and slide-up accelerations respectively; and if the slide-down acceleration is less than the slide-up acceleration, the virtual object is triggered to switch from running to sliding tackle. However, the Applicant(s) has found during the long-term research and development process that the solutions in the above-mentioned related technologies have the following deficiencies. 1. For the player, there is a lack of prompts on how to trigger the sliding tackle function and whether it is triggered, and thus it is easy to cause misoperation or blank operation. 2. The system cannot detect the critical value of the touch point in the movement control area in real time. 3. The path for calculating accelerations and monitoring decision logic is very complicated.

According to one or more embodiments of the present disclosure, a method for controlling movement of a virtual object in a game is provided. It should be noted that the steps shown in the flowcharts of the accompanying drawings may be implemented in a computer system such as a set of computer-executable instructions. Although a logical order is shown in the flowcharts, in some cases, the steps shown or described herein may be performed in an order different from that shown or described herein.

Reference may be made to FIG. 1, which illustrates a method for controlling movement of a virtual object in a game according to one or more embodiments of the present disclosure. The method may include the following steps S110, S120, and S130, as shown in FIG. 1.

In Step S110, a movement control area and a movement state control are provided in the user interface.

In Step S120, the virtual object is controlled to be in the first movement state in the game scene according to the first touch operation. The first touch operation is a sliding operation where the initial touch point is located in the movement control area and the final touch point is located in the movement state control.

In Step S130, in response to the virtual object being in the first movement state, and a second touch operation on the movement state control, the virtual object is controlled to move from the first movement state to a second movement state in the game scene. The second touch operation is a touch operation that occurs after the touch point of the first touch operation leaves the movement state control.

In the method for controlling movement of a virtual object in a game provided by an embodiment of the present disclosure, the combined touch operation of the movement control area and the movement state control on the user interface is adopted, and thus the player may use a single finger so that the virtual character in the game may quickly switch between different movement states while controlling the movement direction, thereby improving the coherence and playability of the game operation. In addition, by providing a clear operation area of the movement state control, the problem of misoperation or blank operation that may exist in one-hand operation is solved, and the decision logic of the system is further simplified.

In one or more examples of the present disclosure, when the first movement state is running and the second movement state is sliding tackle, the method may further include the following steps (not shown in the drawings).

When the virtual object completes sliding tackle, in response to detection of the touch point of the second touch operation not leaving the user interface, the virtual object is switched from sliding tackle back to running or running while squatting.

When the virtual object completes sliding tackle, in response to detection of the touch point of the second touch operation leaving the user interface, the virtual object is controlled to remain still in place, for example, to squat down.

It should be understood that the method flowchart shown in FIG. 1 is only an example, and the execution sequence and necessity of each step therein are not limited thereto. For example, a certain step(s) may not necessarily exist, or a certain step(s) may be performed in parallel with other steps.

In the following, each step of the method for broadcasting a signal in a game in an embodiment will be further described.

Figure 2:
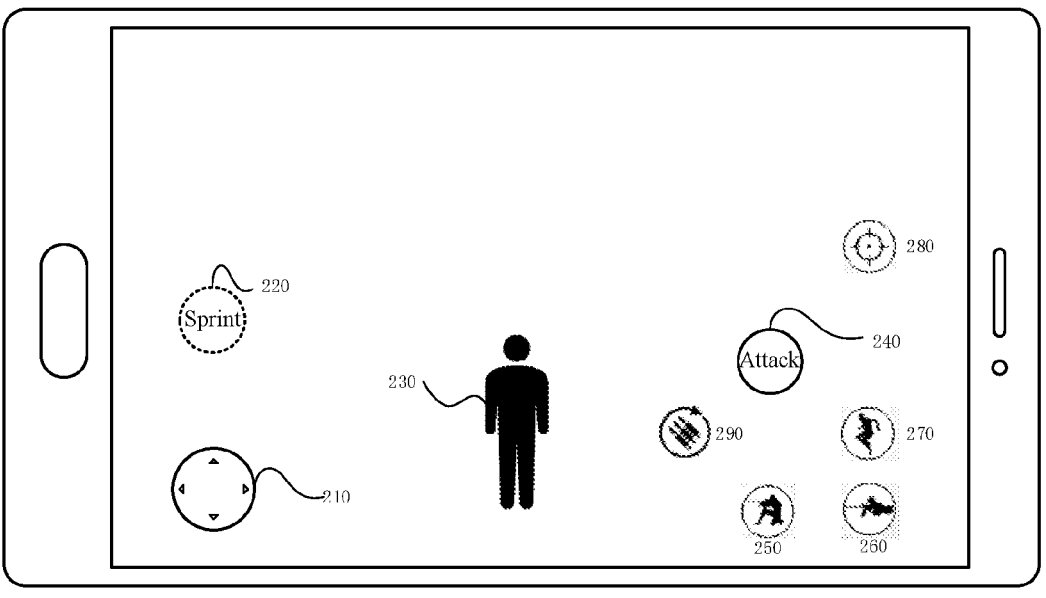
FIG. 2 is a schematic diagram of a user interface of a user terminal according to an embodiment of the present disclosure.

FIG. 2 is a schematic diagram of a user interface of a user terminal in an embodiment of the present disclosure. In an embodiment of the present disclosure, the user interface of the user terminal may include but not limited to a movement control area (for example, a virtual joystick control 210) and a virtual attack control 240. The user interface is also used to display at least part of the game scene, the virtual object 230 in the game scene manipulated by the player user, and/or other virtual objects. In one or more embodiments, the movement control area may be embodied in various forms, so as to realize the function of controlling movement of the virtual objects. For example, the movement control area may be a touch area without visual indication, and the touch area may be set in the preset area of the user interface (such as the left half-screen area). In response to the touch operation on the left half-screen (such as sliding operation), virtual objects are controlled to move around the game scene according to the mapping relationship between movement of the touch operation point and movement of the virtual object. As another example, the movement control area may be a touch area with visual indication (such as the virtual joystick control 210 shown in FIG. 2). The virtual joystick control 210 may be fixedly set on the user interface, or may be dynamically set on the user interface. In an embodiment, the virtual joystick control 210 is set in the user interface. The virtual joystick control 210 is displayed at the current touch position by touching at any position on the left half-screen of the user interface. And the movement direction and/or the movement speed of the virtual object is controlled by sliding the finger in the virtual joystick control 210. Specifically, the movement direction may be determined according to the orientation of the touch point of the finger on the user interface relative to the center of the virtual joystick control 210, and the movement speed may be determined according to the distance of the touch point relative to the center of the virtual joystick control 210.

In step S110, a movement control area and a movement state control are provided in the user interface. In the present disclosure, the movement control area being the virtual joystick control 210 and the movement state control being the virtual sprint control 220 are taken as an example for explaining the detailed solution. It should be understood that the virtual joystick control and the movement state control (for example, the virtual sprint control 220) provided in the user interface may not always be in the visible or active state, but will be activated or displayed only under a certain trigger condition of the touch operation (the specific trigger condition will be further elaborated in FIG. 3), so as to avoid the waste of display resources.

In one or more embodiments of the present disclosure, as shown in FIG. 2, in a shooting game application, the user interface of the user terminal may further include virtual form controls such as a virtual squat control 250, a virtual lay-down control 260, a virtual jump control 270, etc., as well as a virtual aiming control 280 and a virtual reloading control 290 (for simplicity, these controls will be omitted in the following interface diagrams). In one or more examples of the present disclosure, all the above-mentioned virtual controls may be located at any position of the user interface according to different layout settings of the user.

Figure 3:
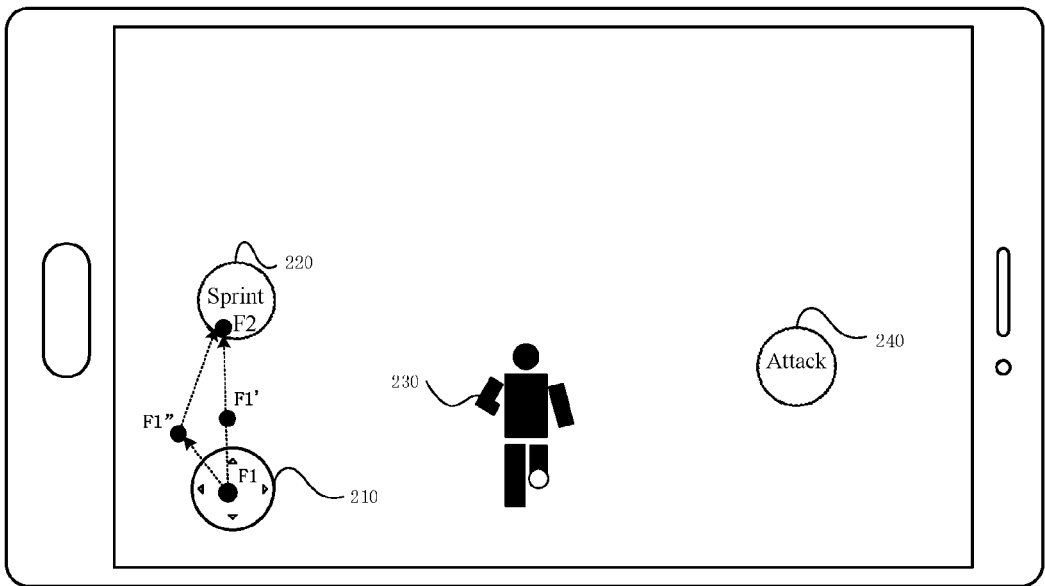
FIG. 3 is a schematic diagram of a preparation stage for controlling movement of a virtual object in a game according to an embodiment of the present disclosure.

FIG. 3 is a schematic diagram of a preparation stage for controlling movement of a virtual object in a game according to an embodiment of the present disclosure. In step S120, the virtual object is controlled to be in a first movement state in the game scene according to a first touch operation. The first touch operation is a sliding operation where the initial touch point (for example, point F1) is located in the movement control area (for example, the virtual joystick control 210) and the final touch point (for example, the point F2) are located on the movement state control (for example, the virtual sprint control 220).

In one or more embodiments of the present disclosure, according to different pre-conditions, the first movement state includes but not limited to: walking, walking while squatting, running, running while squatting, crawling, swimming, climbing, and driving. For example, the first type of pre-condition includes: touch operations on virtual form controls such as virtual squat control, virtual lay-down control, and virtual jump control; then, controlling movement of the virtual object with respect to the touch operations in the movement control area; and thereafter, the form corresponding to the touched form control changes in the first movement state. For example, the state of walking while squatting corresponds to a process of pressing the virtual squat control during or before movement, the state of crawling corresponds to a process of pressing the virtual lay-down control during or before movement, and so on. The second type of pre-condition includes acquiring environmental information in advance, and then determining the movement state of the virtual object according to the environmental information. For example, when the virtual object moves into the water, it automatically changes to swimming. When the virtual object moves in front of a mountain or stairs, it automatically switches to climbing. When the virtual object enters the cockpit, it automatically changes to driving, etc.

In one or more examples of the present disclosure, the second movement state may be but not limited to a part of the virtual object's body sliding close to the ground and towards a specified direction for a preset distance, for example, sliding tackle, rolling forward, floating, diving, drifting, jumping out of a carrier, and the like. It should be understood that the second movement state is obtained by switching from the first movement state of the virtual object, so the two states belong to a series of consecutive actions to achieve an effect as follows. With the rapid switching between movement states, to a certain extent, the virtual object controlled by the player can get rid of the original aiming path of the enemy in body position, so as to avoid attack. Alternatively, it can moves quickly for a certain distance in another posture. The virtual object in the second movement state may, but is not limited to, be allowed to perform actions such as shooting, throwing, switching firearms, etc., thereby launching a counterattack against the enemy during the triggering process of the second movement state. In one or more examples of the present disclosure, in a case where the virtual object is not allowed to switch between movement states, even if the virtual object obtains the second touch operation when the virtual object is in the first movement state, the virtual object will not respond to the second touch operation for performing the action of switching from the first movement state to the second movement state.

In one or more examples of the present disclosure, the above-mentioned control method for virtual objects is not limited to be used in shooting game applications. In one or more examples of the present disclosure, various game applications include but are not limited to Role Playing Games (referred to as RPG), Action Games (referred to as ACT), Adventure Games (referred to as AVG), shooting games, and so on. In one or more examples of the present disclosure, the shooting games may be, but not limited to, a Multiplayer Online Battle Arena (MOBA for short) application, or a Single-Player Game (SPG for short) application. The type of the above-mentioned target shooting game may include but not limited to at least one of the following: two-dimensional (referred to as 2D) game application, three-dimensional (referred to as 3D) game application, Virtual Reality (referred to as VR) game application, Augmented Reality (referred to as AR) game application, and Mixed Reality (referred to as MR) game application. The foregoing is just an example, and an embodiment does not make any limitation thereto. In addition, the virtual object in the above-mentioned target shooting game may be, but not limited to, a role object controlled by the current player who logs into a client of the shooting game application, where the shooting game application may be a Third-Person Shooting Game (referred to as TPS) application, such as observing the virtual object controlled by the current player from a third perspective to run the shooting game application. It may also be a First-Person Shooting Game (referred to as FPS) application, such as running the shooting game application from the perspective of the virtual object controlled by the current player.

In one or more embodiments of the present disclosure, the movement state control is kept in a hidden state or an inactive state (that is, a state of displaying but not responding to an operation), until the first touch operation slides in the movement control area to reach a preset distance (for example, the touch point slides from point F1 to point 1' of the user interface or slides from point 1 to point 1"), so that the movement state control is displayed and activated in the user interface. In one or more embodiments of the present disclosure, in response to the first touch operation sliding in the movement control area to reach a preset distance, the virtual object moves with acceleration in the first movement state.

In one or more examples of the present disclosure, the movement state control (for example, the virtual sprint control 220) may be newly displayed instead of being resident on the user interface. That is, only when the virtual object is in a certain movement state, the movement state control is presented on the user interface. Specifically, when the virtual object moves in the game scene in the first movement state, the movement state control is presented only when the first touch operation slides to reach the preset distance (that is, the trigger condition mentioned above), thereby saving display resources, while still the virtual object begins to accelerate in the first movement state, such as from walking to sprinting (both are the first movement states). For example, when the virtual object is in the standing state or other still state, the movement state control is not presented.

In one or more examples of the present disclosure, the movement state control herein (for example, the virtual sprint control 220) may always be presented in the user interface. When the virtual object is sprinting, the movement state control is placed in an active state. The movement state control can only be triggered when it is in the active state. In one or more examples of the present disclosure, the movement state control (for example, the virtual sprint control 220) is always displayed and activated on the user interface. When it is touched, the virtual object can be controlled to directly enter the sprinting state from the still state.

Figure 4:
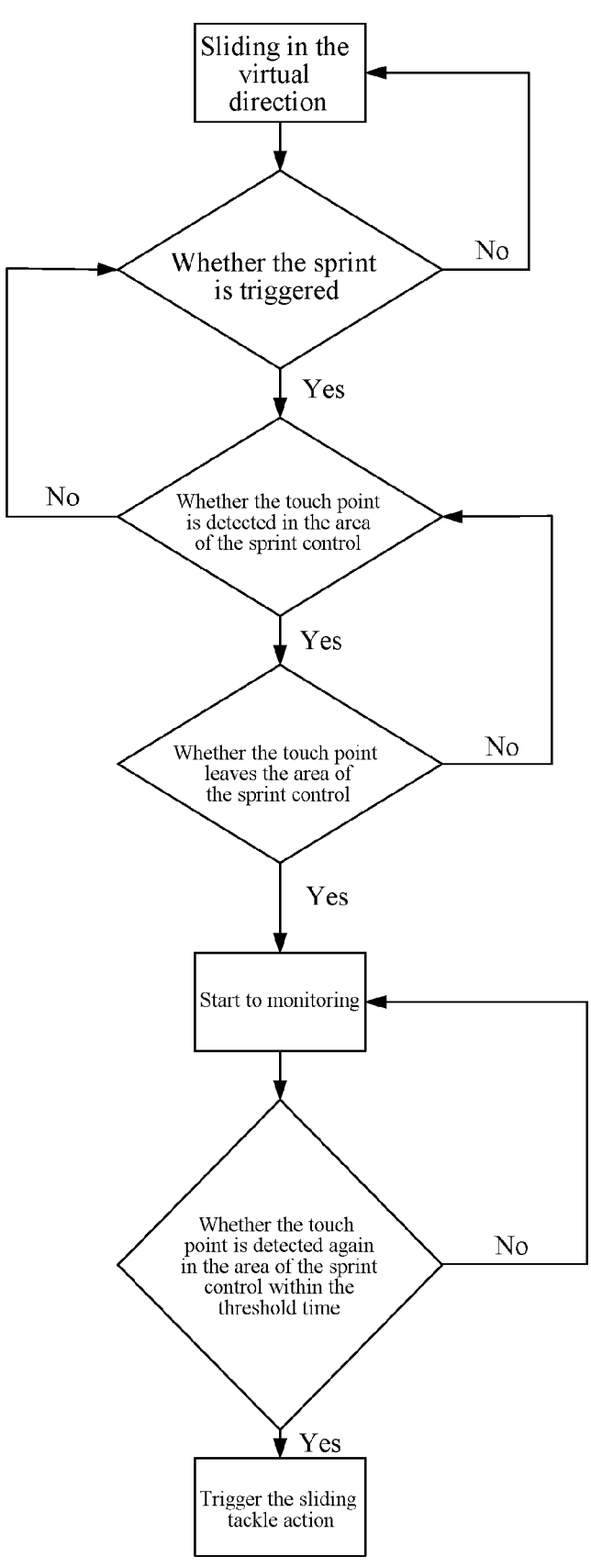
FIG. 4 is a logic decision diagram for controlling movement of a virtual object in a game according to an embodiment of the present disclosure.

FIG. 4 is a logic decision diagram for controlling movement of a virtual object in a game according to an embodiment of the present disclosure. In step S130, when the virtual object is in the first movement state, in response to the second touch operation on the movement state control, the virtual object is controlled to switch from the first movement state to the second movement state in the game scene. The second touch operation is a touch operation that occurs after the touch point of the first touch operation leaves the movement state control. In one or more examples of the present disclosure, the second touch operation may be a sliding operation continuous with the first touch operation. At this time, the word of "leave" means that the touch point of the first touch operation moves outward away from the movement state control while keeping the finger always in contact with the screen. In one or more examples of the present disclosure, the second touch operation may also be a click operation, a long press operation, or a press operation disconnected from the first touch operation. At this time, the word of "leave" means that the finger for the first touch operation is lifted off the screen at the position of the movement state control.

According to one or more embodiments of the present disclosure, the specific decision logic for controlling movement of a virtual object in a game is as follows.

Herein, it is taken as an example that the virtual object is a virtual character, the first movement state is sprinting, and the second movement state is sliding tackle. Firstly, when the player user performs a first touch operation on a movement control area (for example, a virtual joystick control) on the user interface, the virtual object starts to move. Then, according to whether the first touch operation meets the trigger condition (for example, the sliding on the virtual joystick control reaches the preset distance), it is determined whether the virtual object is in the first movement state (that is, whether sprinting has been triggered). If yes, then it is started to detect whether the touch point of the first touch operation falls into the movement state control (that is, whether the touch point is detected in the area of the virtual sprint control); otherwise it returns to continue determining. When it is detected that the touch point of the first touch operation has been located in the movement state control, it starts to detect whether the touch point of the first touch operation has left the response area of the movement state control (that is, whether the touch point has left the response area of the virtual sprint control), so as to determine the start of the second touch operation. If yes, it is started to monitor the second touch operation; otherwise it returns to continue detection. The touch point leaving the virtual sprint control indicates that the touch point leaves the user interface (that is, the touch point disappears), and the touch point moves out of the virtual sprint control. If leaving the response area of the movement state control indicates sliding away and the touch point does not disappear, it is considered that the second touch operation is continuous with the first touch operation. That is to say, the initial touch point of the second touch operation is the final touch point when the first touch operation slides away from the movement state control. If leaving the response area of the movement state control indicates controlling the finger for the first touch operation to lift from the screen at the position of the movement state control, it is considered that the second touch operation is discontinuous with the first touch operation. In the process of starting to monitor, it is detected whether the touch point of the second touch operation returns to the response area of the movement state control within the preset time (that is, whether the touch point is detected again in the area of the virtual sprint control within the threshold time). If yes, the virtual object is triggered to switch from the first movement state (for example, sprinting state) to the second movement state (for example, sliding tackle state); otherwise it returns to continue monitoring. Preferably, if the second touch operation is continuous with the first touch operation, the preset time may be set to 0.5 seconds. If the second touch operation is discontinuous with the first touch operation, the preset time may be set so that a upper limit exits about the maximum time that the virtual character is automatically in the sprinting state.

It should be noted that one or more embodiments of the present disclosure are not limited to controlling the switching of the virtual object between the sprinting state and the sliding tackle state, but may also be controlling the switching of the virtual object between other movement states. For example, as a character, the virtual object may be in the first movement state such as walking, walking while squatting, running, running while squatting, etc., and then switched to the second movement state such as sliding tackle or rolling forward. Alternatively, the virtual object may be switched from the first movement state such as swimming and space floating to the second movement state such as floating or diving. Further alternatively, as a carrier, the virtual object may be in the normal driving state first, and then be switched to the second movement state of drifting or the driver jumping out of the carrier.

Figure 5:
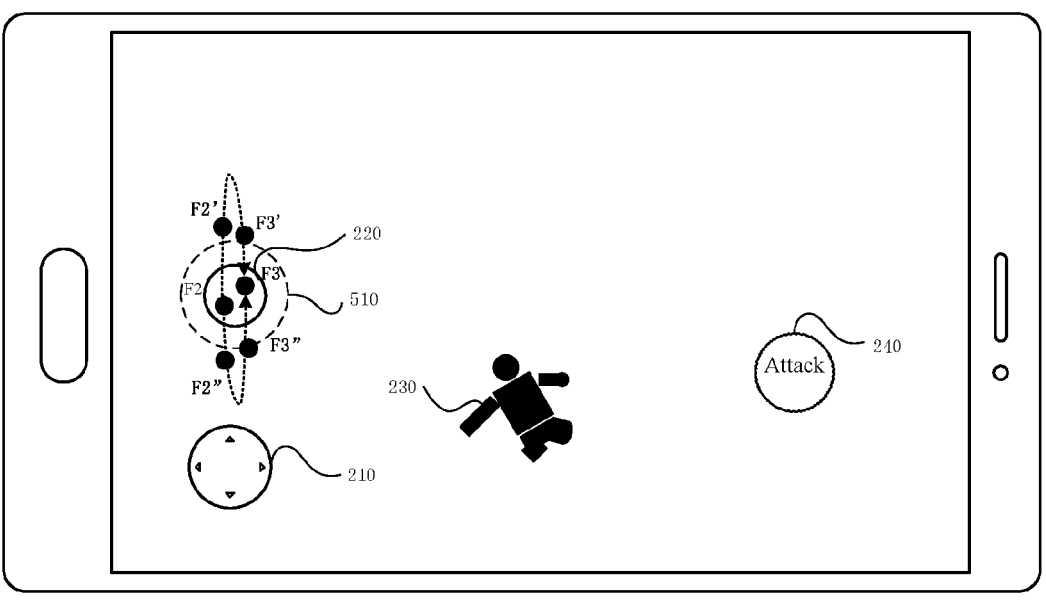
FIG. 5 is a schematic diagram of an execution stage for controlling movement of a virtual object in a game according to an embodiment of the present disclosure.

FIG. 5 is a schematic diagram of an execution stage for controlling movement of a virtual object in a game according to an embodiment of the present disclosure.

In one or more embodiments of the present disclosure, the second touch operation and the first touch operation are continuous in operation. In one or more examples of the present disclosure, the second touch operation is a sliding operation (for example, along one of the two dotted sliding trajectories in FIG. 5), and the initial touch point of the second touch operation is the final touch point when the first touch operation slides away from the movement state control (for example, the touch point moves out of the virtual sprint control).

Under the above conditions, step S130 includes the following two sub-steps.

In response to the final touch point of the first touch operation leaving the response area of the movement state control, it is started to monitor the sliding of the touch point of the second touch operation on the user interface.

In response to detection, within a preset time, of the final touch point of the first touch operation leaving the response area of the movement state control and then the touch point of the second touch operation returning to the response area of the movement state control again, the virtual object is controlled to switch from the first movement state to a second movement state in the game scene. In one or more examples of the present disclosure, the preset time may be 0.2 second, 0.5 second, or 1 second.

Reference may be made to FIG. 5, where the response area of the virtual sprint control 220 may be a dotted circular area 510. It should be noted that the size of the response area 510 may be adjusted according to the setting of the player user. In one or more examples of the present disclosure, the response area 510 may be set to be the same size as the virtual sprint control 220, or set to be slightly larger than the virtual sprint control 220. In one or more examples of the present disclosure, once the final touch point of the first touch operation moves beyond the boundary of the response area 510 of the virtual sprint control 220, it starts to monitor the second touch operation and the initial touch point of the second touch operation is regarded as the final touch point of the first touch operation.

In one or more embodiments of the present disclosure, the second touch operation may follow the first touch operation and slide outward from the virtual sprint control 220 to the boundary of the response area 510, and then continue to slide outward for a certain distance and restarts the sliding operation for sliding toward the response area 510 again. Preferably, the second touch operation may slide up from the point F2 for a certain distance and then slide down to return to the point F3 in the response area 510 of the virtual sprint control 220. The specific sliding trajectory may be split into F2-->F2'-->F3'-->F3, where the point F2' completely leaving the response area 510 is regarded as the final touch point of the first touch operation, that is, the initial touch point of the second touch operation. At this time, it is started to monitor the second touch operation. When it is detected that the second touch operation slides up and down and returns to the point F3' at the boundary of the response area 510, the sliding time from F2' to F3' is calculated. If the sliding time is less than or equal to a preset time (for example, 0.5 seconds), the determination condition is satisfied. In addition, preferably, the second touch operation may slide down from the point F2 for a certain distance and then slide up to return to the point F3 in the response area 510 of the virtual sprint control 220. The specific sliding trajectory may be split into F2-->F2"-->F3"-->F3, where the point F2" completely leaving the response area 510 is regarded as the final touch point of the first touch operation, that is, the initial touch point of the second touch operation. At this time, it is started to monitor the second touch operation. When it is detected that the second touch operation slides down and then slides up and returns to the point F3" at the boundary of the response area 510, the sliding time from F2" to F3" is calculated. If the sliding time is less than or equal to a preset time (for example, 0.5 seconds), the determination condition is satisfied. In one or more embodiments of the present disclosure, in response to the determination condition being met, the virtual object is controlled to switch from the first movement state (eg, sprinting) to the second movement state (eg, sliding tackle) in the game scene.

Figure 6:
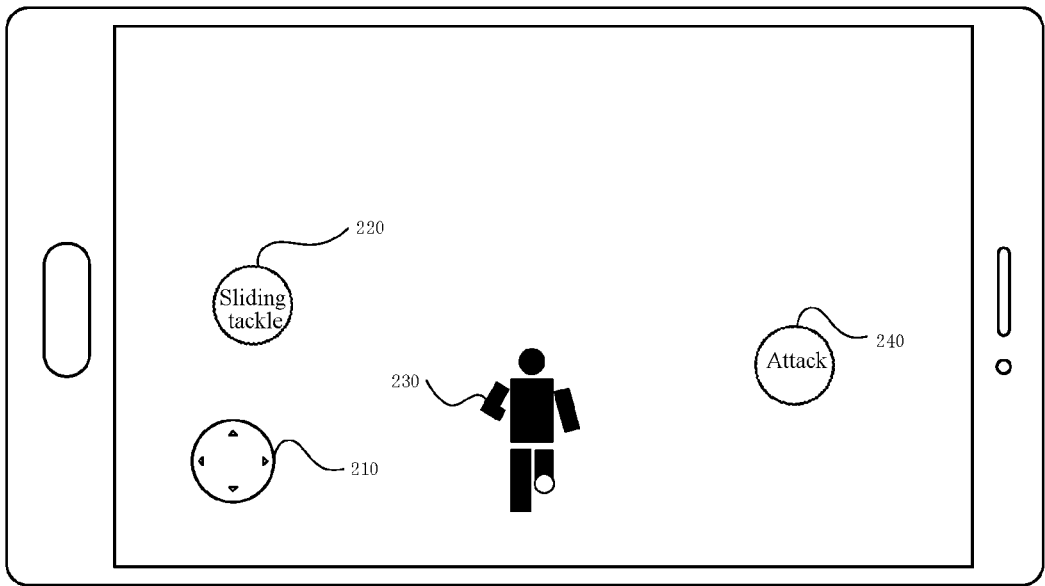
FIG. 6 is a schematic diagram of an execution stage for controlling movement of a virtual object in a game according to another embodiment of the present disclosure.
Figure 7:
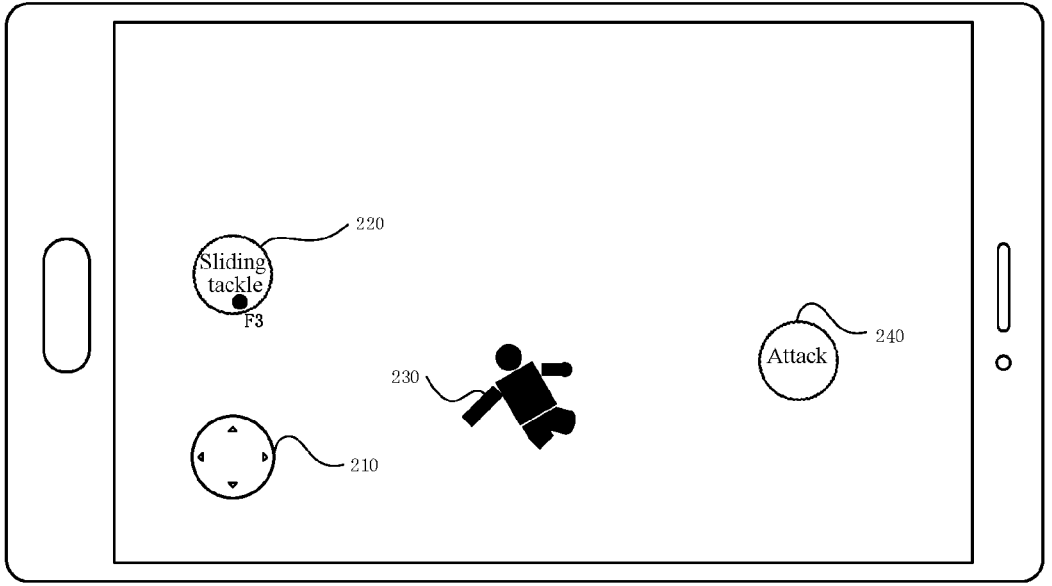
FIG. 7 is a schematic diagram of an execution stage for controlling movement of a virtual object in a game according to another embodiment of the present disclosure

FIGS. 6 and 7 are schematic diagrams of an execution stage for controlling movement of a virtual object in a game according to another embodiment of the present disclosure.

In one or more embodiments of the present disclosure, the second touch operation and the first touch operation are discontinuous in operation. That is to say, the second touch operation starts after the touch point of the first movement touch operation leaves the user interface of the user terminal. In one or more examples of the present disclosure, the second touch operation is a click operation or a long press operation, and occurs after the finger for the first touch operation lifts off the screen at the position where the movement state control is located.

Under the above conditions, step S130 includes the following two sub-steps.

When the final touch point of the first touch operation leaves the user interface at the position of the movement state control, the display state of the movement state control is changed. As shown in FIG. 6, when the first touch operation with the final touch point located on the movement state control (for example, the virtual sprint control 220 in FIG. 3) ends, the virtual object 230 remains in the sprinting state. At the same time, the movement state control is changed from the virtual sprint control 220 displaying a text or icon of "sprint" in FIG. 3 to the virtual sliding control 220 displaying a text or icon of "sliding tackle" in FIG. 6. It should be understood that the virtual sprint control 220 and the virtual sliding tackle control 220 are the same movement state control located at the same position in the user interface, but their display states and trigger functions have changed.

In response to the second touch operation on the movement state control (for example, the virtual sliding tackle control 220) after the display state has changed, the virtual object 230 is controlled to switch from the first movement state to the second movement state in the game scene. As shown in FIG. 7, while the virtual object 230 is kept in the sprinting state, if a click operation or a long press operation is detected again in the response area of the movement state control (for example, the virtual sliding tackle control 220) (for example, the touch point F3 of the second touch operation on the virtual sliding control 220 is detected), the virtual object 230 is controlled to switch from the sprinting state to the sliding tackle state.

Figure 8A:
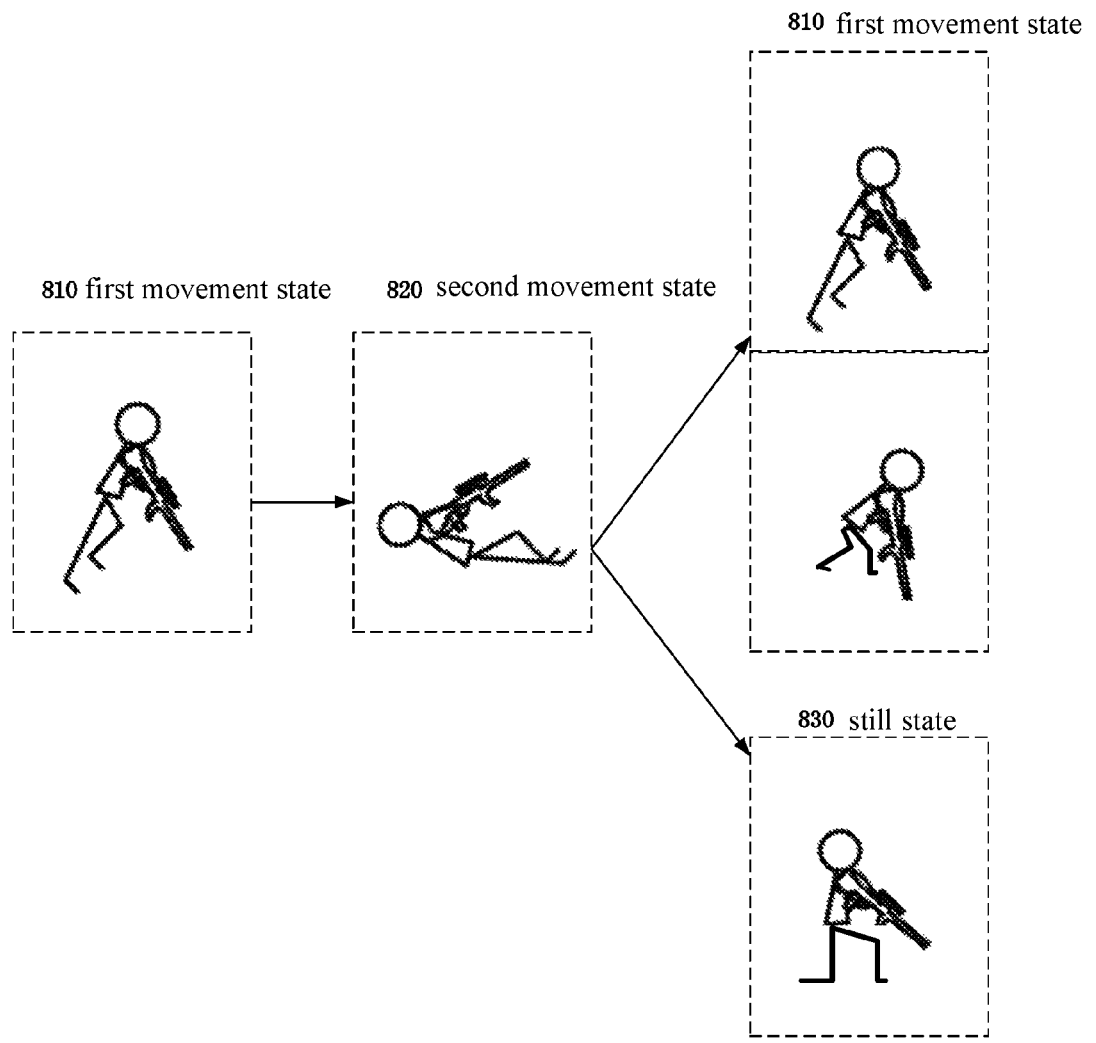
FIG. 8*a*, FIG. 8*b*, and FIG. 8*c* are schematic diagrams respectively of an end stage for controlling movement of a virtual object in a game according to an embodiment of the present disclosure.
Figure 8B:
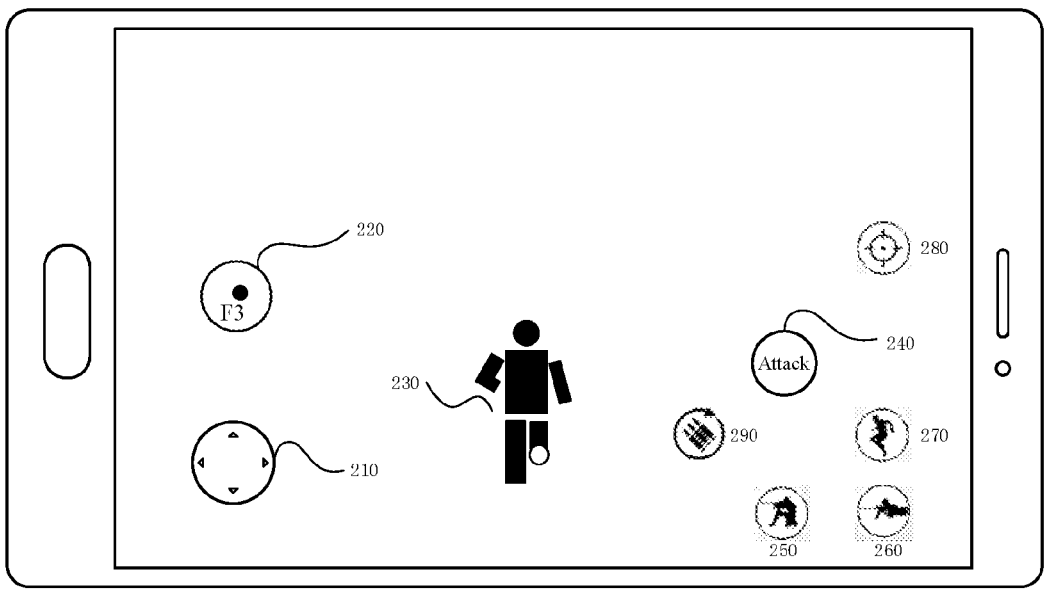
Figure 8C:
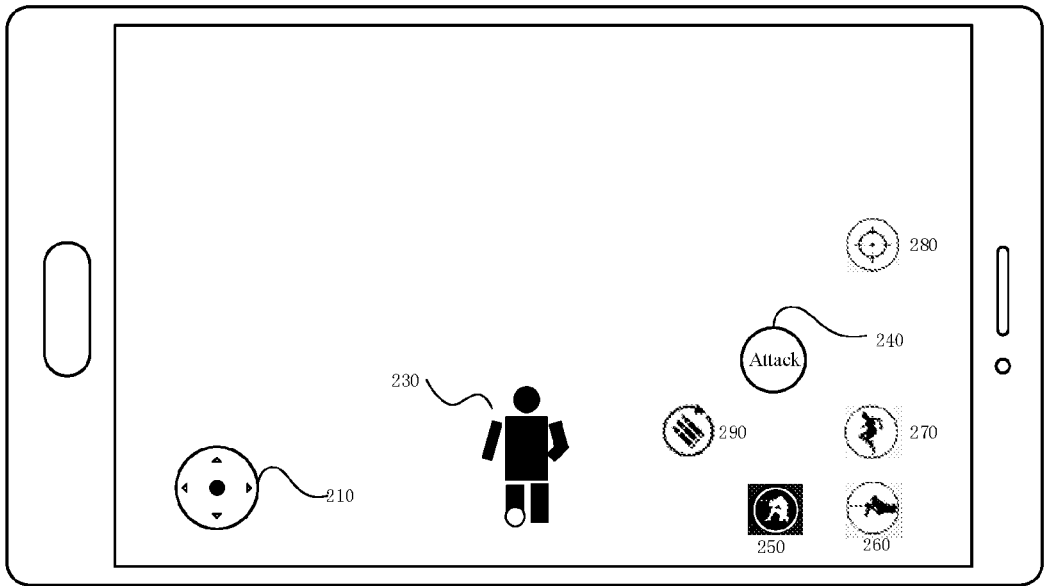

FIG. 8*a*, FIG. 8*b*, and FIG. 8*c* are schematic diagrams respectively of an end stage for controlling movement of a virtual object in a game according to an embodiment of the present disclosure. When the second movement state ends (for example, when the sliding tackle action ends), the virtual object may be controlled to enter the third state. Those skilled in the art may set the third state according to the actual needs of the game. For example, the third state may be to restore the first movement state, so that after the end of the second movement state, the virtual object continues to move according to the action before sliding tackle, or follow other actions in the first movement state different from the action before sliding tackle. For another example, the third state may be a still state, such as squatting, standing, or laying-down, so as to facilitate controlling the subsequent actions of the virtual object according to the subsequent operations of the player user.

The above content will be explained in detail below in conjunction with FIGS. 8*a*-8*c*, where it is taken as an example that the first movement state 810 is running and the second movement state 820 is sliding tackle.

As shown in FIG. 8*a*, after completing the above sliding tackle action, the virtual object may be controlled to return to the first movement state 810, such as running. The virtual object may also be controlled to switch to other first movement states different from running, such as walking or running while squatting. It is also possible to control the virtual object to maintain in a still state 830 in place, such as squatting down.

In one or more examples of the present disclosure, when the virtual object enters the third state from the second movement state, the display state and/or the touch response function of the virtual form control on the user interface related to the third state are adjusted according to the third state, so that the display state and/or the touch response function of the corresponding virtual form control match the third state.

In one or more embodiments of the present disclosure, as shown in FIG. 8*b*, when the subsequent operation of the second touch operation is that the user's finger (that is, the touch point F3) does not leave the screen and still stays on the movement state control (such as, the virtual sliding tackle control 220), after the virtual object completes the sliding tackle action, it immediately gets up and resumes the movement state before switching to sliding tackle (for example, the "running or walking" state), which may be determined depending on the specific first movement state before the sliding tackle action is executed. As shown in FIG. 8*c*, when the subsequent operation of the second touch operation is the user's finger leaving the screen, after the virtual object performs the sliding tackle action, the movement is stopped and it is kept still (for example, keep in the standing or squatting posture). If the squatting posture is maintained, the virtual button on the virtual joystick control on the left side of the user interface is reset, and the display state of the virtual squat control 250 on the right side is set to the pressed state. At this time, the touch response function of the virtual squat control 250 is clicked to control the virtual object to stand. On the contrary, if the third state is the standing state, that is, the virtual object after sliding tackle is in the standing state, then the display form of the virtual squat control 250 is set to the unpressed state. At this time, the touch response function of the virtual squat control 250 is clicked to control the virtual object to squat. That is to say, the virtual object squats in place, and then the player user may control movement of the virtual object again through the virtual joystick control 210 and other virtual form controls (for example, the virtual squat control 250, the virtual lay-down control 260, and the virtual jump control 270).

In the solutions provided by the above embodiments, the first and second movement states of the virtual object are implemented on the mobile game operation control to achieve a single-finger coherent operation, which improves usability of the game in emergency situations. For example, the left hand may be used to implement the operation of sliding tackle, and the right hand may be released to perform the attack operation, thereby improving richness and playability of the game, and improving the convenience of operation.

Figure 9A:
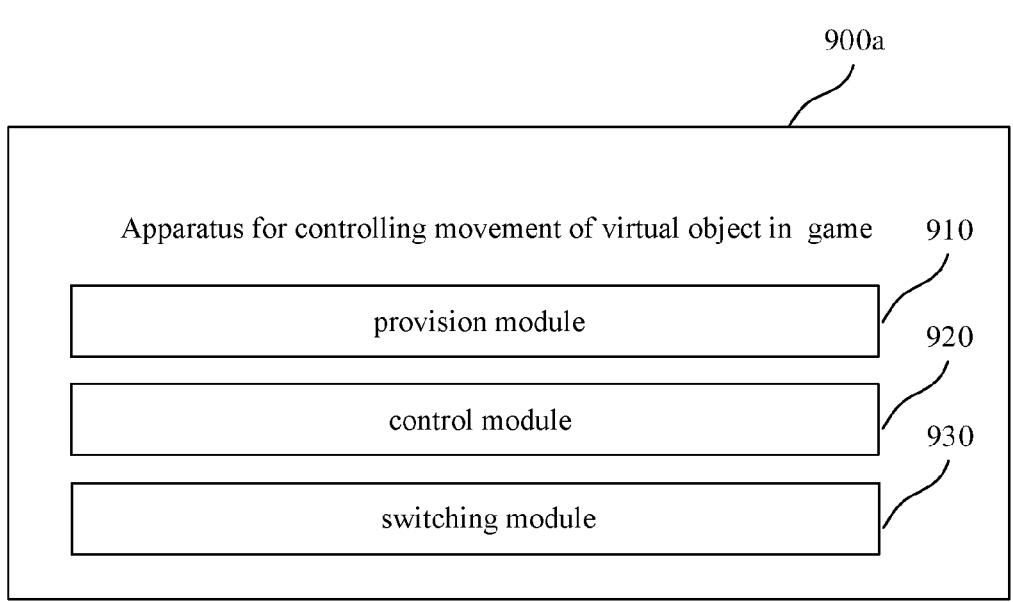
FIG. 9*a* and FIG. 9*b* schematically show a block diagram respectively of an apparatus for controlling movement of a virtual object in a game according to an embodiment of the present disclosure.

In an embodiment of the present disclosure, an apparatus for controlling movement of a virtual object in a game is further provided. Referring to FIG. 9*a*, the apparatus 900*a* may include a provision module 910, a control module 920, and a switching module 930.

The provision module 910 may be used to provide a movement control area and a movement state control on the user interface.

The control module 920 may be configured to control the virtual object to be in a first movement state in the game scene according to a first touch operation. The first touch operation is a sliding operation where the initial touch point is located in the movement control area and the final touch point is located on the movement state control.

The switching module 930 may be configured to, in response to the virtual object being in the first movement state and a second touch operation on the movement state control, control the virtual object in the game scene to switch from the first movement state to the second movement state. The second touch operation is a touch operation that occurs after the touch point of the first touch operation leaves the movement state control.

Figure 9B:
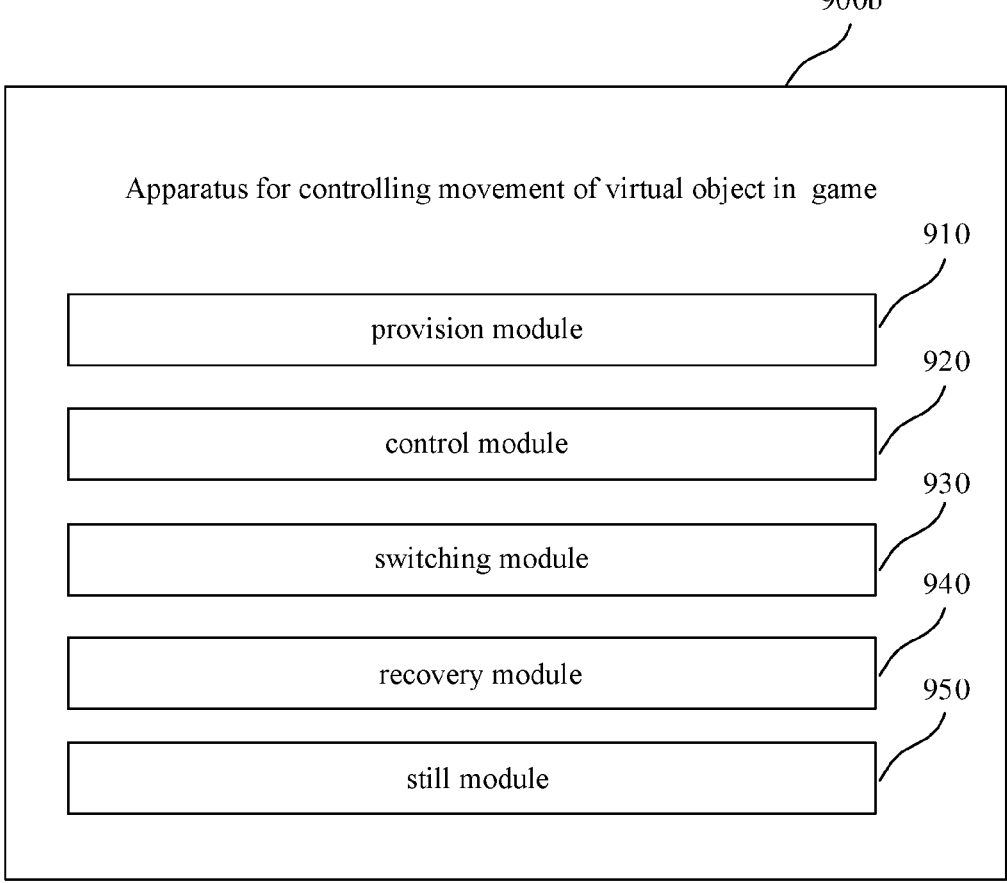

In one or more examples of the present disclosure, as shown in FIG. 9*b*, the apparatus 900*b* may further include a recovery module 940 and a still module 950 in addition to the above-mentioned modules 910-930.

The recovery module 940 may be configured to, in response to the virtual object completing sliding tackle and detection of the touch point of the second touch operation not leaving the user interface, switch the virtual object from the sliding tackle back to running.

The still module 950 may be configured to, in response to the virtual object completing sliding tackle and detection of the touch point of the second touch operation leaving the user interface, control the virtual object to remain still in place.

It should be understood that the apparatus 900*a/b* in FIG. 9*a/b* is only an example, and the arrangement sequence and necessity of each module therein are not limited thereto. For example, a certain module(s) may not necessarily exist, or the functions of a certain module(s) may be implemented by another module(s) instead.

In an embodiment of the present disclosure, an electronic device configured to implement the above method is further provided.

Those skilled in the art can understand that various aspects of the present disclosure may be implemented as a system, method or program product. Therefore, various aspects of the present disclosure may be embodied in the following forms, namely: a complete hardware implementation, a complete software implementation (including firmware, microcode, etc.), or a combination of hardware and software implementations, which may be collectively referred to herein as "circuit", "module", or "system".

An electronic device 1000 according to an embodiment of the present disclosure is described below with reference to FIG. 10. The electronic device 1000 shown in FIG. 10 is only an example, and should not limit the functions and scope of use of embodiments of the present disclosure.

Figure 10:
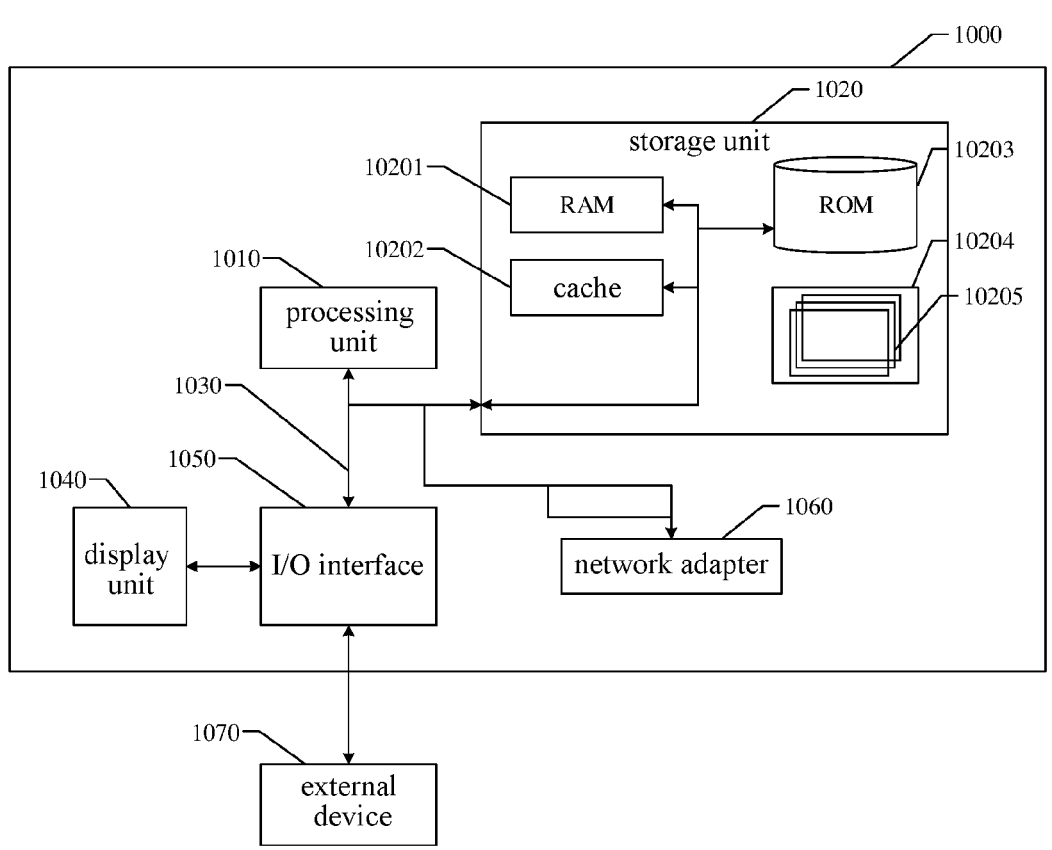
FIG. 10 schematically shows a schematic structural diagram of an electronic device according to an embodiment of the present disclosure.

As shown in FIG. 10, the electronic device 1000 takes the form of general-purpose computing device. The components of the electronic device 1000 may include, but are not limited to: at least one processing unit 1010 described above, at least one storage unit 1020 described above, a bus 1030 connecting different system components (including the storage unit 1020 and the processing unit 1010), and a display unit 1040.

The storage unit stores program codes, and the program codes may be executed by the processing unit 1010, so that the processing unit 1010 executes the steps according to various embodiments of the present disclosure described in the "Detailed Description" section of this specification. For example, the processing unit 1010 may execute the steps shown in FIG. 2.

The storage unit 1020 may include a readable medium in the form of volatile storage unit, such as a random access storage unit (RAM) 10201 and/or a cache storage unit 10202, and may further include a read-only storage unit (ROM) 10203.

The storage unit 1020 may also include a program or utility 10204 having a set of (at least one) program modules 10205. Such program modules 10205 including but not limited to: an operation system, one or more application programs, other program modules, and program data. Implementations of the networked environments may be included in each or some combination of these examples.

The bus 1030 may represent one or more of several types of bus structures, including a storage unit bus or storage unit controller, a peripheral bus, an accelerated graphics port, a processing unit, or a local bus using any of a variety of bus structures.

The electronic device 1000 may also communicate with one or more external devices 1070 (such as keyboards, pointing devices, Bluetooth devices, etc.), and may also communicate with one or more devices that enable the user to interact with the electronic device 1000, and/or communicate with any device (e.g., router, modem, etc.) that enables the electronic device 1000 to communicate with one or more other computing devices. Such communication may occur through the input/output (I/O) interface 1050. Moreover, the electronic device 1000 may also communicate with one or more networks (such as a local area network (LAN), a wide area network (WAN), and/or a public network such as the Internet) through the network adapter 1060. As shown, the network adapter 1060 communicates with other modules of the electronic device 1000 through the bus 1030. It should be appreciated that although not shown, other hardware and/or software modules may be used in conjunction with the electronic device 1000, including but not limited to: microcodes, device drivers, redundant processing units, external disk drive arrays, RAID systems, tape drives, and data backup storage system, etc.

Through the description of the above implementations, those skilled in the art can easily understand that the example implementations described here may be implemented by software, or by a combination of software and necessary hardware. Therefore, the technical solutions according to embodiments of the present disclosure may be embodied in the form of software products, and the software products may be stored in a non-volatile storage medium (which may be CD-ROM, U disk, mobile hard disk, etc.) or on the network, including several instructions to enable a computing device (which may be a personal computer, a server, a terminal device, or a network device, etc.) to execute the method according to embodiments of the present disclosure.

In an embodiment of the present disclosure, there is also provided a computer-readable storage medium, on which a program product capable of implementing the above-mentioned method in this specification is stored. In some possible implementations, various aspects of the present disclosure may also be implemented in the form of program product, which includes program codes. When the program product runs on the terminal device, the program codes are used to enable the terminal device to execute the above-mentioned steps according to various embodiments of the present disclosure described in the "Detailed Description" section.

Figure 11:
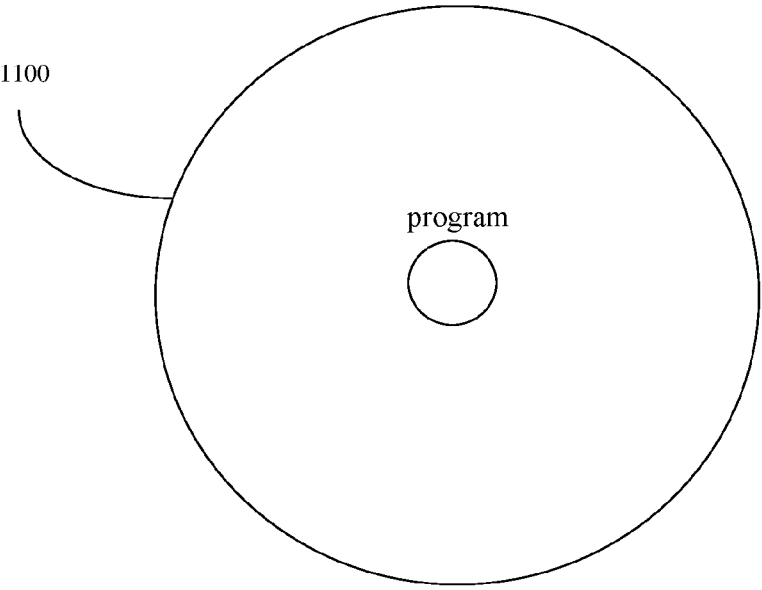
FIG. 11 schematically shows a program product according to an embodiment of the present disclosure.

As shown in FIG. 11, a program product 1100 for implementing the above method according to an embodiment of the present disclosure is described, which may adopt a portable compact disk read-only memory (CD-ROM) and include program codes, and may be running on a terminal device, for example on a personal computer. However, the program product of the present disclosure is not limited thereto. In this document, a readable storage medium may be any tangible medium containing or storing a program, and the program may be used by or in combination with an instruction execution system, apparatus, or device.

A program product may take the form of any combination of one or more readable media. The readable medium may be a readable signal medium or a readable storage medium. The readable storage medium may be, for example, but not limited to, an electrical, magnetic, optical, electromagnetic, infrared, or semiconductor system, apparatus, or device, or any combination thereof. More specific examples (non-exhaustive list) of readable storage media include: an electrical connection with one or more conductors, a portable disk, a hard disk, a random access memory (RAM), a read only memory (ROM), an erasable programmable read-only memory (EPROM or flash memory), an optical fiber, a portable compact disk read-only memory (CD-ROM), an optical storage device, a magnetic storage device, or any suitable combination of the foregoing.

A computer readable signal medium may include a data signal carrying readable program codes in baseband or as part of a carrier wave. Such propagated data signal may take many forms, including but not limited to an electromagnetic signal, an optical signal, or any suitable combination of the foregoing. A readable signal medium may also be any readable medium other than a readable storage medium, and the readable medium may transmit, propagate, or transport a program for use by or in conjunction with an instruction execution system, apparatus, or device.

The program codes embodied on a readable medium may be transmitted using any appropriate medium, including but not limited to wireless, wireline, optical fiber cable, RF, etc., or any suitable combination of the foregoing.

The program codes for performing operations of the present disclosure may be written in any combination of one or more programming languages, including an object-oriented programming language-such as Java, C++, etc., as well as a conventional procedural programming language-such as "C" or similar programming language. The program codes may execute entirely on the user's computing device, partly on the user device, as a stand-alone software package, partly on the user's computing device and partly on a remote computing device, or entirely on the remote computing device or a server. In cases involving a remote computing device, the remote computing device may be connected to the user computing device through any kind of network, including a local area network (LAN) or a wide area network (WAN), or may be connected to an external computing device (e.g., using an Internet service provider to connect via the Internet).

In addition, the above-mentioned drawings are only schematic illustrations of processes included in the method according to embodiments of the present disclosure, and are not intended to be limiting. It is easy to understand that the processes shown in the above figures do not imply or limit the chronological order of these processes. In addition, it is also easy to understand that these processes may be executed synchronously or asynchronously in multiple modules, for example.

It should be noted that although several modules or units of the device for executing actions are mentioned in the above detailed description, this division is not mandatory. Actually, according to an embodiment of the present disclosure, the features and functions of two or more modules or units described above may be embodied in one module or unit. Conversely, the features and functions of one module or unit described above may be further divided to be embodied by a plurality of modules or units.

Other embodiments of the present disclosure will be readily apparent to those skilled in the art after consideration of the specification and practice of the invention disclosed herein. The present disclosure is intended to cover any modification, use or adaptation of the present disclosure. These modifications, uses, or adaptations follow the general principle of the present disclosure and include common knowledge or conventional technical means in the technical field not disclosed in the present disclosure. The specification and examples are to be considered exemplary only, with the true scope and spirit of the present disclosure indicated by the appended claims.

It should be understood that the present disclosure is not limited to the precise constructions which have been described above and shown in the drawings, and various modifications and changes may be made without departing from the scope thereof. The scope of the present disclosure is limited only by the appended claims.

What is claimed is:

1. A method for controlling movement of a virtual object in a game, comprising:

providing a movement control area and a movement state control in a user interface of a user terminal, wherein at least a part of a game scene is displayed in the user interface, and the game comprises the game scene and the virtual object in the game scene;

controlling the virtual object to be in a first movement state in the game scene according to a first touch operation, wherein the first touch operation is a sliding operation, wherein an initial touch point of the first touch operation is located in the movement control area and a final touch point of the first touch operation is located on the movement state control; and in response to the virtual object being in the first movement state and in response to detecting a second touch operation on the movement state control, controlling the virtual object to switch from the first movement state to a second movement state in the game scene, wherein the second touch operation is a touch operation occuring after a touch point of the first touch operation leaves or disappears from the movement state control;

wherein when the first touch operation with the final touch point located on the movement state control ends, the virtual object remains in a sprinting state, and at the same time, the movement state control is changed from a virtual sprint control to a virtual sliding control.

2. The method according to claim 1, wherein the second touch operation and the first touch operation are continuous operations.

3. The method according to claim 2, wherein the second touch operation and the first touch operation being continuous operations, indicates that:

the second touch operation is a sliding operation, and an initial touch point of the second touch operation is the final touch point of the first touch operation on the movement state control; and wherein controlling the virtual object to switch from the first movement state to the second movement state in the game scene in response to detecting the second touch operation on the movement state control, comprises:

in response to a final touch point of the first touch operation leaving a response area of the movement state control, monitoring sliding of a touch point of the second touch operation on the user interface, and in response to detection of the touch point of the second touch operation returning to the response area of the movement state control within a preset time, controlling the virtual object to switch from the first movement state to the second movement state in the game scene.

4. The method according to claim 1, wherein the second touch operation and the first touch operation are discontinuous operations.

5. The method according to claim 4, wherein the second touch operation and the first touch operation being discontinuous operations, indicates that:

the second touch operation is a click operation or a long press operation, and the final touch point of the first touch operation leaves or disappears from the movement state control; and the controlling the virtual object to switch from the first movement state to the second movement state in the game scene in response to the second touch operation on the movement state control, comprises:

in response to the final touch point of the first touch operation leaving the user interface from the position of the movement state control, changing a display state of the movement state control, and

in response to the second touch operation on the movement state control after change of the display state, controlling the virtual object to switch from the first movement state to the second movement state in the game scene.

6. The method according to claim 1, wherein the first movement state indicates one of: walking, walking while squatting, running, running while squatting, crawling, swimming, or driving; and the second movement state indicates one of: sliding tackle, rolling forward, floating, diving, drifting, or jumping out of a carrier.

7. The method according to claim 6, wherein the first movement state is running and the second movement state is sliding tackle; and the method further comprises:
in response to the virtual object completing sliding tackle and detection of a touch point of the second touch operation not leaving the user interface, switching the virtual object from sliding to running.

8. The method according to claim 6, wherein the first movement state is running and the second movement state is sliding tackle, and the method further comprises:
in response to the virtual object completing sliding tackle and detection of a touch point of the second touch operation leaving the user interface, controlling the virtual object to remain still in place.

9. The method according to claim 1, wherein, the controlling the virtual object to be in the first movement state in the game scene according to the first touch operation, comprises:
keeping the movement state control in a hidden state or inactive state, until the first touch operation slides in the movement control area to reach a preset distance, thereby displaying and activating the movement state control in the user interface.

10. The method according to claim 9, wherein the virtual object is accelerated in the first movement state in response to the first touch operation sliding in the movement control area to reach the preset distance.

11. The method according to claim 1, wherein the movement state control comprises the virtual sprint control.

12. The method according to claim 1, wherein the first movement state and the second movement state are consecutive actions.

13. The method according to claim 1, further comprising:
controlling the virtual object in the second movement state to launch a counterattack against an enemy.

14. The method according to claim 1, wherein
in response to the second touch operation on the movement state control after a display state has changed, the virtual object is controlled to switch from the first movement state to the second movement state in the game scene.

15. The method according to claim 8, wherein
after the virtual object performs a sliding tackle action, the virtual object is stopped in movement and kept still, and
if a squatting posture is maintained, a virtual button on a virtual joystick control on a left side of the user interface is reset, and a display state of the virtual squat control on a right side of the user interface is set to a pressed state.

16. The method according to claim 15, wherein
a touch response function of the virtual squat control is clicked to control the virtual object to stand.

17. The method according to claim 8, wherein
if the virtual object after the sliding tackle is in a standing state, a display form of a virtual squat control is set to a unpressed state, and
a touch response function of the virtual squat control is clicked to control the virtual object to squat.

18. An electronic device, comprising:
a memory, configured to store computer executable programs; and
a processor, configured to execute the computer-executable program stored on the memory to perform a method for controlling movement of a virtual object in a game, wherein
the game comprises a game scene and the virtual object in the game scene,
at least a part of the game scene is displayed in a user interface of a user terminal, and the method comprises:
providing a movement control area and a movement state control in the user interface;
controlling the virtual object to be in a first movement state in the game scene according to a first touch operation, wherein the first touch operation is a sliding operation, wherein an initial touch point of the first touch operation is located in the movement control area and a final touch point of the first touch operation is located on the movement state control; and
in response to the virtual object being in the first movement state and in response to detecting a second touch operation on the movement state control, controlling the virtual object to change from the first movement state to a second movement state in the game scene, wherein the second touch operation is a touch operation occuring after a touch point of the first touch operation leaves or disappears from the movement state control;
wherein when the first touch operation with the final touch point located on the movement state control ends, the virtual object remains in a sprinting state, and at the same time, the movement state control is changed from a virtual sprint control to a virtual sliding control.

19. A non-transitory computer-readable storage medium, wherein a computer-executable program is stored on the non-transitory computer-readable storage medium, and the computer-executable program is configured to, when loaded and executed by a processor, implement a method for controlling movement of a virtual object in a game, wherein
the game comprises a game scene and the virtual object in the game scene,
at least a part of the game scene is displayed in a user interface of a user terminal, and the method comprises:
providing a movement control area and a movement state control in the user interface;
controlling the virtual object to be in a first movement state in the game scene according to a first touch operation, wherein the first touch operation is a sliding operation, wherein an initial touch point of the first touch operation is located in the movement control area and a final touch point of the first touch operation is located on the movement state control; and
in response to the virtual object being in the first movement state and in response to detecting a second touch operation on the movement state control, controlling the virtual object to change from the first movement state to a second movement state in the game scene, wherein the second touch operation is a touch operation occuring after a touch point of the first touch operation leaves or disappears from the movement state control;

wherein when the first touch operation with the final touch point located on the movement state control ends, the virtual object remains in a sprinting state, and at the same time, the movement state control is changed from a virtual sprint control to a virtual sliding control.

* * * * *